May 23, 1972 D. E. WITKIN 3,664,540
VARIABLE CLEARANCE THREAD CLOSURE
Filed June 11, 1970 2 Sheets-Sheet 1

United States Patent Office 3,664,540
Patented May 23, 1972

3,664,540
VARIABLE CLEARANCE THREAD CLOSURE
Donald E. Witkin, Warren, Pa., assignor to
National Forge Company, Irvine, Pa.
Filed June 11, 1970, Ser. No. 45,305
Int. Cl. B65d *41/04*
U.S. Cl. 220—39 R                    8 Claims

ABSTRACT OF THE DISCLOSURE

A thread system for use on screw type closure structures for high pressure vessels wherein the thread form of either the closure plug or the pressure vessel is machined such that when the vessel is unpressurized the load bearing surfaces of the vessel and plug threads are spaced apart by distances which vary from a predetermined maximum between the innermost threads to a predetermined minimum at the outermost threads. The variable clearance between the threads is calculated so as to enable the outer threads to deflect as levers in order that all of the threads are uniformly stressed when the vessel is pressurized.

BACKGROUND OF THE INVENTION

The invention relates to an improved threaded closure means for high pressure metallic vessels and more particularly to an improved flexible thread system.

In certain high pressure applications, such as those involving isostatic pressure vessels having threaded closures, it is desirable that the closure threads be uniformly stressed. The stress distribution on the threads of most prior threaded closures for pressure vessels has a parabolic-like function with the highest axial stresses imposed on the threads which are nearest the internal pressure in the vessel and with the stresses decreasing in the threads outward from the inner portion of the closure.

There are also radial stresses in the pressure vessel which further distort or increase the axial stresses on the threads. This has necessitated that the closure constructions in many prior closures have overdesigned cross sections in order to provide adequate safety factors.

The invention may be applied to isostatic pressure vessels or to pressure vessels of other types. It may be applied to thread form which have parallel or helical screw threads. The threads may be continuous thread-screw and nut type or have interrupted parallel or helical threads such as are in common use for the breeches of artillery guns. In any of these cases the thread profile of the invention may be adapted to the particular application.

SUMMARY OF THE INVENTION

In accordance with the invention, there is provided a thread system for use in screw-type high pressure vessel closures wherein the thread forms of the vessel and closure plug are machined such that when the vessel is unpressurized the load bearing surfaces of the vessel and closure plug threads are spaced apart by distances which vary from a predetermined maximum between the innermost threads to a predetermined minimum at the outermost threads. The distances are so calculated that substantially all the load bearing surface of the vessel thread form is in contact with the load bearing surface of the closure plug thread form when a predetermined pressure is generated within the closed vessel.

The variable clearance between the threads allows the outermost threads to become the first load bearing threads when the vessel is pressurized and to deflect as levers up to a predetermined amount. As this deflection takes place, the innermost threads become successively load bearing until all of the threads bear substantially the same load.

The principal object of the invention is to provide a novel and improved thread system.

In particular it is the object of the invention to provide a thread system for use with pressure vessel closures in which the threads have a substantially uniform stress.

A further object of the invention is the provision of an improved thread system for pressure vessel closures wherein the threads have a flexibility characteristic enabling the individual threads to deflect as levers.

The present invention, as well as further objects and features thereof, will become more fully apparent from the following detailed description of certain preferred embodiments, when read with reference to the accompanying drawings.

DESCRIPTION OF THE PREFERRED EMBODIMENTS

Figure 1:
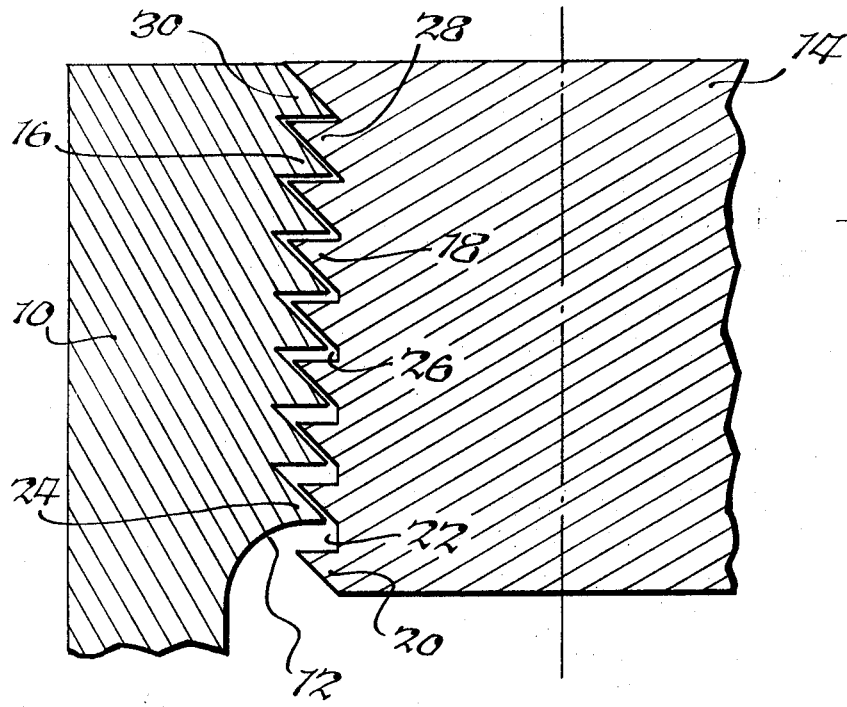
FIG. 1 is a view in central vertical section of a portion of the closure area of a high pressure vessel showing the thread form of one embodiment of the invention.

With reference now to FIG. 1 in particular, a portion of a high pressure vessel 10 provided with a threaded opening 12 into which a threaded plug 14 is screwed to close off the interior of the vessel has been illustrated. The vessel 10 may have any configuration. The opening 12 is provided with a female thread form designated as 16 while the closure plug is provided with a male thread form designated as 18.

Buttress type threads are illustrated for the screw type closure but the improved thread construction is not limited to this type of thread, as has been previously indicated.

In most prior threaded closures, the stress distribution on the threads has a parabolic-like function, with the greatest stress being on the first load bearing threads of the closure plug and the vessel wall.

In the threaded closure of one embodiment of the invention, however, the innermost end 20 of the plug thread form is relieved so as to create a clearance 22 between its load bearing surface and the load bearing surface of the innermost end 24 of the vessel thread form. The remaining plug threads moving outwardly of the closure are relieved by successively lesser amounts to create decreasing clearances, designated generally as 26, between the load bearing surfaces of the mated vessel and plug threads.

Thus the thread clearance varies from a maximum between the innermost ends 20 and 24 of the plug and vessel thread forms to substantially zero at the outermost ends 28 and 30 of the thread forms. The purpose of these clearances is to improve the load distribution on the threads by compensating for differential elastic deformations of the threads.

The degree of differential elastic deformation can be calculated for a particular type of threaded closure, taking into account the physical properties of the materials used in its construction, by treating the threads in a mathematical model as cantilevers.

Figure 2:
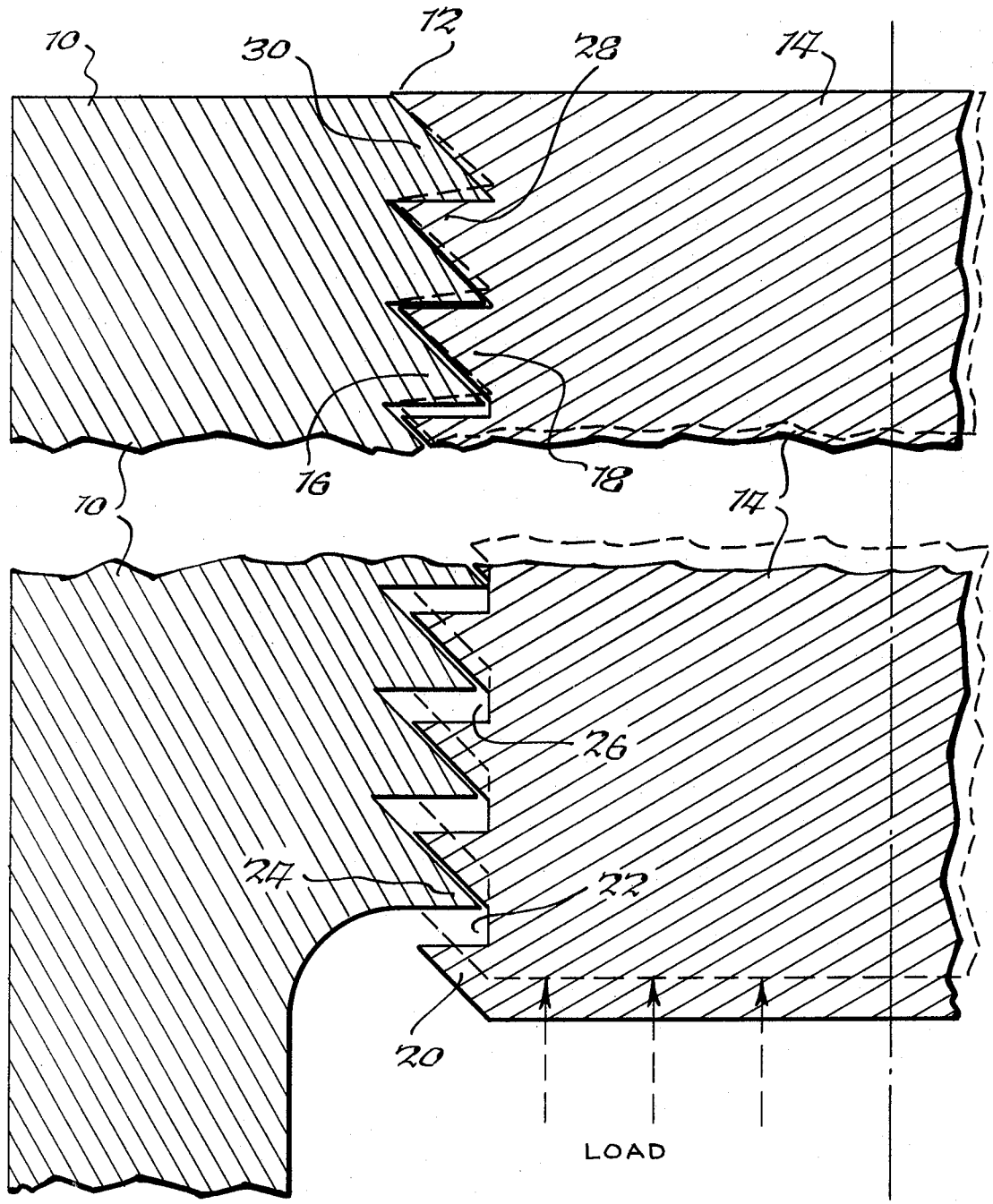
FIG. 2 shows portions of the threaded closure of FIG. 1 drawn to an enlarged scale for purposes of clarity, illustrating in dashed lines and to an exaggerated extent, thread deflections which take place upon pressurization of the vessel.

Referring now to FIG. 2, the function of the clearances is illustrated in an exaggerated fashion. When a load is applied to the bottom of the closure plug 14, as by pressurizing the vessel 10, the outermost end 28 of the plug thread form and the outermost end 30 of the vessel thread form will be the first to bear the load because they are the only threads initially having substantially no clearance between them.

As shown in dotted line fashion both the vessel thread 30 and the closure thread 28 will become elastically deformed allowing the closure plug to move outwardly to some extent. This will have the effect of reducing the clearance 22 between the innermost load bearing threads as well as the remaining clearances 26 until the inner thread ends 20 and 24 are in contact with each other and become load bearing. By properly calculating the variable thread relief, the loading upon the threads can be made substantially uniform and the level of the maximum load on the innermost threads is significantly reduced. The thread clearances 22 and 26 are greatly exaggerated for purposes of illustration. By means of example only, the maximum relief 22 in a pressure vessel threaded closure according to one embodiment of the invention would be on the order of 0.01 inch.

It should be apparent that the vessel thread 16 may also be variably relieved or both the vessel thread 16 and the closure plug thread 18 may be variably relieved in other embodiments.

Figure 3:
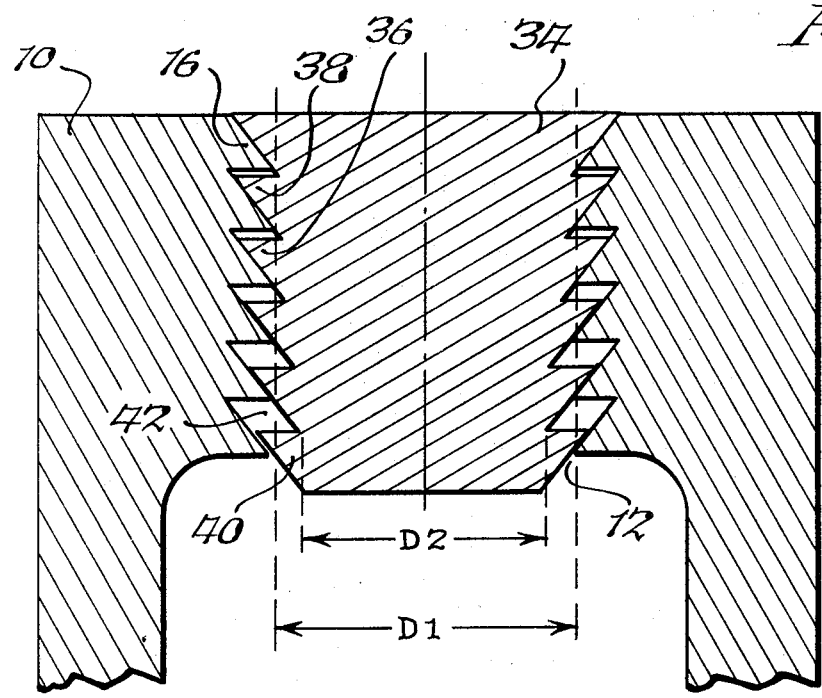
FIG. 3 is a view in central vertical section of a portion of the closure area of a high pressure vessel showing a thread form of a second embodiment of the invention.

Referring now to FIG. 3 a second embodiment of the invention is shown comprising the pressure vessel 10 with its threaded opening 12 and female thread form 16. A threaded closure plug 34 engages the threaded opening 12. The closure plug 34 has a thread form 36 whose pitch increases from a matching pitch with the thread form 16 at the outermost end 38 of the thread form 36 to a predetermined maximum at the innermost end 40 of the thread form 36.

The increasing pitch of the thread form 36 necessitates that its root diameter decrease inwardly of the vessel. Thus the root diameter of the outermost end 38 of the thread has a dimension D1 which is greater than the root diameter D2 at the innermost end 40 of the thread.

The variable pitch of the thread form 36 along with the decrease in thread root diameter provides for a variable thread clearance 42 between the female and male thread forms 16 and 36 respectively which varies from a minimum at the outermost end 38 of the thread to a maximum at the innermost end 40 of the thread.

In other embodiments the female thread form of the vessel is provided with a variable pitch which decreases inwardly of the vessel and has a thread root diameter which increases inwardly of the vessel. In still other embodiments, the pitches of both the male and female thread forms are varied proportionately to create a variable clearance between the threads which increases from a predetermined minimum at the outermost ends of the thread forms to a predetermined maximum at the innermost ends of the thread forms.

As in the embodiments of FIGS. 1 and 2, the variable clearance 42 created by a variable pitch threaded allows the threads to be sequentially loaded when the vessel is pressurized such that all of the threads bear a substantially uniform load.

The terms and expressions which have been employed here are used as terms of description and not of limitation, and there is no intention, in the use of such terms and expressions, of excluding equivalents of the features shown and described, or portions thereof, it being recognized that various modifications are possible within the scope of the invention claimed.

What is claimed is:

1. An improved screw type closure structure for high pressure vessels and the like of the type wherein a male threaded member and a female threaded member are screwed into complementary threaded engagement, wherein the improvement comprises male and female thread forms for the complementary threaded members machined such that when the male and female thread forms are substantially fully engaged with each other and the vessel is unpressurized the load bearing surfaces of the male and female threads are spaced apart by a clearance which varies substantially uniformly from a predetermined maximum between the ends of the threads closest to the interior of the vessel to a predetermined minimum between the ends of the threads furthest from the interior of the vessel, the variable clearance being selected such that substantially all the load bearing surface of the male thread is in contact with the load bearing surface of the female thread when a predetermined pressure is generated within the closed vessel.

2. An improved screw type closure structure for high pressure vessels and the like of the type wherein a male threaded member and a female threaded member are screwed into complementary threaded engagement, wherein the improvement comprises male and female thread forms for the complementary threaded members, at least one of the thread forms being of a constant pitch with the thread being relieved by an amount which decreases from a predetermined maximum for the end of the thread closest to the interior of the vessel to substantially no relief at the end of the thread furthest from the interior of the vessel, such that when the vessel is unpressurized the load bearing surfaces of the male and female threads are spaced apart by a clearance which varies from a predetermined maximum between the ends of the threads closest to the interior of the vessel to a predetermined minimum between the ends of the threads furthest from the interior of the vessel, the variable clearance being selected such that substantially all the load bearing surface of the male thread is in contact with the load bearing surface of the female thread when a predetermined pressure is generated within the closed vessel.

3. An improved screw type closure structure for high pressure vessels and the like of the type wherein a male threaded member and a female threaded member are screwed into complementary threaded engagement, wherein the improvement comprises male and female thread forms for the complementary threaded members, at least one of the thread forms having a pitch which increases from one end of the thread towards the other, the pitch variation being selected so as to variably space apart the load-bearing surfaces of the male and female thread forms when the vessel is unpressurized, the variable spacing being selected such that substantially all the load bearing surface of the male thread is in contact with the load bearing surface of the female thread when a predetermined pressure is generated within the closed vessel.

4. A screw type closure as recited in claim 3 wherein at least one of the thread forms has a pitch which decreases outwardly of the vessel.

5. A screw type closure as recited in claim 4 wherein the male and female thread forms have a matching pitch at the outermost end of their thread forms.

6. A screw type closure as recited in claim 2 wherein the variation of the thread relief is such that the load carried by any thread is substantially equal to the load carried by any other thread when a predetermined pressure is generated within the closed vessel.

7. A screw type closure as recited in claim 3 wherein the pitch variation is such that the load carried by any thread is substantially equal to the load carried by any other thread when a predetermined pressure is generated within the closed vessel.

8. A screw type closure as recited in claim 1 wherein the variation of the thread clearance is such that the load carried by any thread is substantially equal to the load carried by any other thread when a predetermined pressure is generated within the closed vessel.

References Cited
UNITED STATES PATENTS

| | | | |
|---|---|---|---|
| 3,027,042 | 3/1962 | Graves | 220—39 |
| 2,870,668 | 1/1959 | Flahaut | 85—32 T |
| 3,346,278 | 10/1967 | Yocum | 85—46 X |
| 3,487,442 | 12/1969 | Rossmann | 220—39 |

M. HENSON WOOD, JR., Primary Examiner

M. Y. MAR, Assistant Examiner

U.S. Cl. X.R.

220—3; 85—32 T, 46